J. C. BARRY.
REGULATOR.
APPLICATION FILED SEPT. 13, 1907.
1,003,416.
Patented Sept. 19, 1911.
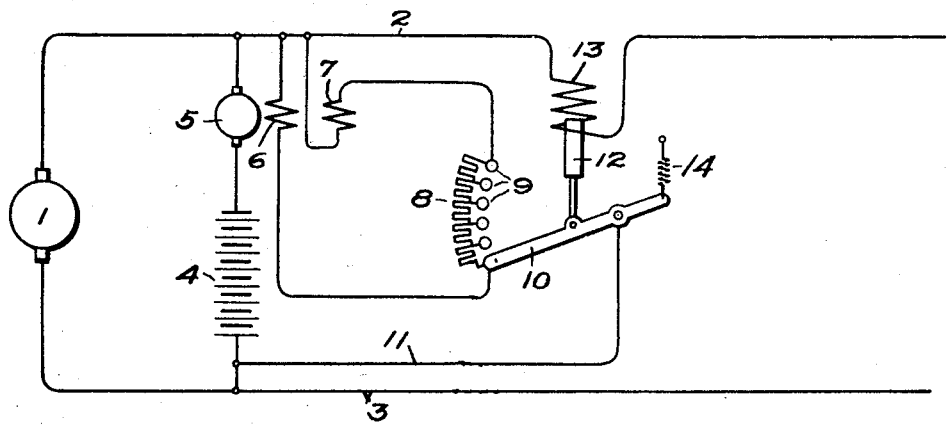
Witnesses
J. Earl Ryan
Marcus L. Byng.
Inventor
John C. Barry
by Albert H. Davis
Atty

UNITED STATES PATENT OFFICE.

JOHN C. BARRY, OF SCHENECTADY, NEW YORK, ASSIGNOR TO GENERAL ELECTRIC COMPANY, A CORPORATION OF NEW YORK.

REGULATOR.

1,003,416.  Specification of Letters Patent.  Patented Sept. 19, 1911.

Application filed September 13, 1907. Serial No. 392,631.

*To all whom it may concern:*

Be it known that I, JOHN C. BARRY, a citizen of the United States, residing at Schenectady, county of Schenectady, State of New York, have invented certain new and useful Improvements in Regulators, of which the following is a specification.

My invention relates to dynamo electric machines, such as boosters, in which it is necessary to vary both the direction and amount of current supplied by the machine, and more particularly to boosters connected in series with storage or secondary batteries to control the output of the battery. Both the direction and the amount of current delivered by dynamo electric machines, particularly boosters connected in series with secondary batteries, have been controlled by having one field coil for producing a constant magneto-motive force in one direction in the field and varying or overcoming the effect of the field coil by an opposing coil regulated by some suitable device such as a rheostat. In order to change the direction of the current delivered by the machine, the opposing coil must be more powerful than the field coil and requires considerable current, so that the entire construction is expensive and inefficient. A single field coil has also been used arranged so that a varying amount of current can be sent through it in either direction. This arrangement requires a reversing switch or equivalent device and complicated mechanism for controlling the current in either direction.

The object of my invention is to provide a simple and efficient regulator, which enables both the direction and amount of current from a dynamo electric machine to be varied, which will produce a maximum regulating effect with a fixed amount of material and apparatus, which will respond quickly to varying demands on the machine, and which is in general an improvement on regulating devices, as is more fully pointed out in the accompanying specification.

In carrying out my invention, a dynamo electric machine is provided with means, such as differential wound field coils for producing opposing magneto-motive forces in the field of the machine together with a regulating or controlling device for simultaneously varying the magneto-motive forces, preferably by simultaneously varying the amount of current flowing in each coil. The coils may be of the same size, and when one is exerting its maximum effect the other is practically cut out of circuit, so that by my invention a maximum range of magneto-motive forces can be impressed on the field with a minimum amount of winding on the field and a small current which may be easily controlled. In the preferred arrangement, a resistance is connected in series with each coil, and as one resistance is decreased the other is correspondingly increased, preferably by some suitable automatic device. When my invention is used to control a booster in series with a secondary battery, the differential coils are preferably connected in shunt with the battery and booster, and the current in one coil is increased while that in the other coil is simultaneously decreased by a device responsive to current in the circuit supplied by the battery.

My invention will best be understood in connection with the accompanying drawing, which is an illustration of one embodiment of my invention and shows a booster connected in series with a storage battery and equipped with a regulator embodying my invention, which is applicable to dynamo electric machines generally, but particularly to boosters.

In the arrangement shown in the drawing, a generator 1 is connected to leads 2 and 3 of a consumption circuit, which has a storage or secondary battery 4 and a booster 5 arranged in series and connected across the circuit and in parallel with the generator 1 for the purpose of equalizing the load on the generator. It is necessary that the booster be so controlled that when the load on the consumption circuit is large, the booster will enable the battery to take its share of the load and discharge into the circuit, while when the load on the circuit is small, the booster will enable the generator 1 to charge the storage battery.

In accordance with my invention, both the direction and amount of current delivered by the booster is varied by means, consisting of differentially wound field coils 6 and 7, for generating opposing magneto-motive forces which can be simultaneously varied to control the output of the booster. The amount of magneto-motive force in either direction generated by the differential coils 6 and 7 is regulated by decreasing the amount of current flowing through one coil and simultaneously increasing the amount of current flowing through the other coil. This result may be attained in any suitable manner, but in the preferred arrangement, as shown in the drawing, both coils are connected to the lead 2, and also to each other through a resistance 8 divided into sections each connected to a field contact 9, the whole forming the resistance unit of a rheostat, of which the other member is a movable contact arm 10 moving over and engaging the fixed contacts 9, and thereby varying the amount of resistance between the end of the contact arm 10 and one or the other of the coils 6 and 7. The contact arm 10 is connected through a lead 11 to the other lead 3 of the consumption circuit, so that both coils 6 and 7 are connected in shunt across the circuit and in series with a rheostat comprising the contact arm 10, the fixed contacts 9 and the resistance 8. The position of the arm 10 is automatically controlled by means of the movable core 12, of a coil 13 connected in series with the lead 2 of the consumption circuit, and by a spring 14 connected to the arm 10 to move it against the pull of the core 12.

The operation of the device is as follows: When the booster should deliver a maximum current in one direction, the contact arm 10 assumes the position shown in the drawing, in which all of the resistance 8 is in series with the coil 7, while there is no resistance in series with the coil 6. The coil 6 is therefore producing its maximum effect, and the magneto-motive force produced by it is opposed only by a very slight magneto-motive force due to the small current flowing through the coil 7 and the resistance 8. As conditions on the circuit change and the arm 10 is moved upward by the action of the coil 13, resistance is cut into circuit with the coil 6 and out of circuit with the coil 7, so that as the magneto-motive force produced by the coil 6 decreases, the opposing magneto-motive force due to the coil 7 simultaneously increases. When the arm 10 is midway of its travel, the resistance 8 is divided into two equal portions, one in series with the coil 6 and the other in series with the coil 7, so that in this condition the coils exactly counterbalance each other. When the booster should generate a maximum current flowing in the opposite direction, the arm 10 is moved to its uppermost position, whereby the entire resistance 8 is put in series with the coil 6, and the coil 7 receives current across the system.

In a machine embodying my invention, it is not necessary that one coil be more powerful than the other, and the resistance 8 can be made so high in proportion to the resistance of the coils that a coil with which the entire resistance is in series, is practically eliminated from the field of the booster. If an arrangement heretofore used were adopted, and the coil 6, for instance, were always connected to produce a definite magneto-motive force in the field of the booster, the coil 7 would have to be large enough to produce magneto-motive forces varying from zero to twice that produced by the coil 6 in order to obtain a range of regulation equal to that obtained by the arrangement shown in the drawing. Furthermore, in a machine embodying my invention, a slight change in the position of the regulating arm 10 will produce a considerable change in the voltage and current delivered by the booster, so that the regulator for the field of the booster can be made much smaller than would otherwise be the case.

My invention may be embodied in many other forms than that shown and described, and I therefore do not wish to be restricted to the exact form shown, but intend to cover by the appended claims all changes and modifications within the spirit and scope of my invention.

What I claim as new and desire to secure by Letters Patent of the United States, is:

1. In a system of distribution, the combination with leads forming a main circuit, of a storage battery and a generator connected in series across said circuit, equal and opposed differential shunt field coils for said generator, a resistance element connected in series with both coils, an arm movable over said resistance element to vary the amount of resistance in circuit with each coil, and means responsive to load in said circuit for controlling said arm.

2. In a system of distribution, the combination with a storage battery, a generator in series therewith, and differential field windings for said generator connected in parallel across at least one of said sources of current, of a resistance varying device comprising a resistance strip connected between said windings, an arm movable over said resistance and connected to complete a circuit through both said windings, and current responsive means for moving said arm to decrease the resistance between said arm and one coil and simultaneously increase the resistance between said arm and the other coil by equal amounts.

3. The combination of a system of distribution, a storage battery connected thereto, a generator in series with said battery, a source of current, differential field coils for said generator, each connected at one end to one terminal of said source of current and at the other end to a resistance strip, an arm movable over said resistance strip to form a rheostat, said arm being connected to the other terminal of the source of current, and an electromagnet in series with said distribution system with its armature connected to said arm.

4. In a system of electrical distribution, the combination with a main source of supply connected to leads which form a main circuit, of a storage battery and a generator connected in series across said main circuit, differential field coils for the generator, each connected at one end to one of said leads, a resistance strip connected between the other ends of said field coils, an arm movable over said strip and connected to the other of said leads, and an electromagnetic device controlled by the fluctuations of the load on said main circuit and operatively connected with said arm to move it over said strip.

In witness whereof, I have hereunto set my hand this 11th day of September, 1907.

JOHN C. BARRY.

Witnesses:
BENJAMIN B. HULL,
MARGARET E. WOOLLEY.